United States Patent [19]

Kataoka et al.

[11] 4,277,566

[45] Jul. 7, 1981

[54] CHELATE RESIN PREPARED BY AFTERTREATMENT OF AMINATED RESIN WITH POLYFUNCTIONAL COMPOUND AND AMINE

[75] Inventors: Yushin Kataoka; Masaaki Matsuda; Masaru Kamoda, all of Niihama, Japan

[73] Assignee: Sumitomo Chemical Company, Limited, Osaka, Japan

[21] Appl. No.: 17,324

[22] Filed: Mar. 5, 1979

[30] Foreign Application Priority Data

Mar. 24, 1978 [JP] Japan ............................ 53-34567
Apr. 3, 1978 [JP] Japan ............................ 53-39602

[51] Int. Cl.³ .......................... C02F 1/62; B01J 39/18
[52] U.S. Cl. .................................... 521/32; 423/100
[58] Field of Search .......................................... 521/32

[56] References Cited

U.S. PATENT DOCUMENTS

| | | | |
|---|---|---|---|
| 3,037,945 | 6/1962 | Morris | 521/32 |
| 3,337,480 | 8/1967 | Small | 521/32 |
| 3,410,811 | 11/1968 | Bufton et al. | 521/32 |
| 3,847,841 | 11/1974 | Motani et al. | 521/32 |
| 3,884,846 | 5/1975 | Otsuki et al. | 521/32 |
| 3,892,689 | 7/1975 | Motani et al. | 521/32 |
| 4,101,461 | 7/1978 | Strop et al. | 521/32 |

FOREIGN PATENT DOCUMENTS 2454929  5/1975  Fed. Rep. of Germany ............. 521/32

Primary Examiner—Joseph L. Schofer
Assistant Examiner—Peter F. Kulkosky
Attorney, Agent, or Firm—Stevens, Davis, Miller & Mosher

[57] ABSTRACT

A chelate resin produced by reacting (A) a resin having one or more primary and/or secondary amino groups in the molecule with (B) a polyfunctional compound having at least two reactive groups with amine and (C) an amino compound having one or more primary and/or secondary amino groups, or with a reaction product of said (B) polyfunctional compound and said (C) amino compound, shows excellent heavy metal collecting ability without being influenced by other coexisting ions.

9 Claims, No Drawings

CHELATE RESIN PREPARED BY AFTERTREATMENT OF AMINATED RESIN WITH POLYFUNCTIONAL COMPOUND AND AMINE

This invention relates to a chelate resin, a process for producing said chelate resin, and a method for collecting one or more heavy metals from a solution or gas containing these heavy metals by using said chelate resin.

Recently chelate resins have widely been used as agents for removing heavy metals from waste solutions from plants or for collecting valuable metals from solutions containing said valuable metals. For example, in order to remove heavy metals from a solution such as waste water containing said heavy metals in a concentration of several mg per liter, there have been proposed to use a chelate resin obtained by chloromethylating a styrene-divinylbenzene copolymer and subsequently reacting with iminodiacetic acid (Nikkakyo Geppo 25, (1), 24 (1972)) and to use chelate resins obtained by conducting the Mannich reaction in the presence of iminodiacetic acid, a phenol and an aldehyde and then adding an aldehyde and a phenol to conduct polycondensation (Japanese Pat Appln Kokai (Laid-Open) No. 107092/75, Japanese Pat Appln Kokai (Laid-Open) No. 101490/75, Japanese Pat Appln Kokai (Laid-Open) No. 103590/75), etc.

But these chelate resins are easily influenced by other coexisting ions present in waste water, so that they have disadvantages in that their adsorption ability is remarkably lowered in the case of waste water from plants, or they are high in a heavy metal adsorption equilibrium concentration, when applied to an aqueous solution having a high salt concentration.

The present inventors have studied extensively to produce a chelate resin which is hardly influenced by other coexisting ions comparing with known chelate resins and which is low in a heavy metal adsorption equilibrium concentration, when applied to an aqueous solution having a high salt concentration.

The present invention provides a novel chelate resin prepared by reacting (A) a resin having one or more primary and/or secondary amino groups in the molecule with (B) a polyfunctional compound having at least two amine-reactive groups and (C) an amino compound having one or more primary and/or secondary amino groups, or with a reaction product of said (B) polyfunctional compound and said (C) amino compound.

The present invention also provides a process for producing the chelate resin, and a method for using said chelate resin for collecting one or more heavy metals from a solution or gas containing one or more heavy metals comprising contacting said chelate resin with said solution or gas.

As the (A) resin, any aminated resins having one or more primary and/or secondary amino groups in the molecule can be used. Among them, aminated resins having one or more primary and/or secondary amino groups in the molecule obtained by reacting a resin containing halogen atoms with an amino compound are preferable.

Examples of the resins containing halogen atoms include halogen-containing resins such as polyvinyl chloride, polyvinylidene chloride, polyvinyl bromide, polyvinylidene bromide, polyvinyl iodide, etc., and halogenated resins obtained by halogenating halogen-free resins such as polyethylene, polypropylene, or the like. Of these, chlorine-containing resins are preferable and polyvinyl chloride is more preferable. These halogen-containing resins may be copolymers of the above-mentioned resin components and other copolymerizable ethylenic unsaturated monomers such as acrylonitrile, vinyl acetate, acrylic acid, methacrylic acid, acrylic esters (e.g. methyl acrylate, ethyl acrylate), methacrylic esters (e.g. methyl methacrylate), olefins, or the like. These resins can be used in the form of powders, granules, molded articles, fibers, film, honeycombs, etc.

The amino compound to be used for the reaction with the halogen-containing resin may be any amino compounds which can react with the halogen-containing resin to introduce the primary and/or secondary amino group into the resulting resin.

Examples of such amino compounds include ammonia, aliphatic mono- or polyamines, aromatic mono- or polyamines and derivatives thereof, such as monomethylamine, monoethylamine, ethylenediamine, trimethylenediamine, tetramethylenediamine, pentamethylenediamine, hexamethylenediamine, octamethylenediamine, nonamethylenediamine, hydrazine, diethylenetriamine, triethylenetetramine, tetraethylenepentamine, aniline, o-phenylenediamine, m-phenylenediamine, p-phenylenediamine, p,p'-diaminodiphenylmethane, 2,4-diaminotoluene and 2,6-diaminotoluene.

The halogen-containing resin can be aminated by using a conventional technique to give the aminated resin (A). It is preferable to react the halogen-containing resin with the amino compound in an amount of 1/20 mole or more, preferably 1/10–6/1 moles per gram atom of the halogen atom in the resin.

As the (A) resin, not only the aminated resins mentioned above but also amino resins such as polyethyleneimine, aniline resin, melamine resin, and the like can be used. These resins are hereinafter referred to as "aminated resins".

The aminated resin (A) is reacted with the polyfunctional compound (B) and the amino compound (C) or with the reaction product of the polyfunctional compound and the amino compound in the process of this invention. In the former case, the polyfunctional compound is used in an amount of 1/20 mole or more, preferably 1/10–2/1 moles, per equivalent weight of the amino group in the aminated resin and the amino compound is used in an amount of 1/20 mole or more, preferably 1/10–2/1 moles, per equivalent weight of the amino group in the aminated resin. In the latter case wherein the reaction product is used, the reaction product is used in an amount of 1/20 mole or more, preferably 1/10–2/1 moles, per equivalent weight of the amino group in the aminated resin. The reaction of the aforesaid polyfunctional compound (B) and the aforesaid amino compound (C) may be carried out in the absence or presence of a solvent such as water, N,N-dimethylformamide, dioxane, chloroform, ethanol and methanol, at a temperature of about 10° to 200° C. for a period of about 1 minute to 10 hours. The proportions of the polyfunctional compound and the amino compound in the reaction product are 0.1–1 mole, preferably 0.5–1 mole of the amino compound per mole of the polyfunctional compound.

If the amounts of the polyfunctional compound and the amino compound or the amount of the reaction product of the polyfunctional compound and the amino compound is less than those mentioned above, heavy metal collecting ability of the resulting chelate resin is undesirably lowered and heavy metal adsorption equilibrium concentration cannot be lowered.

The reaction of the aminated resin (A) with the polyfunctional compound (B) and the amino compound (C) or with the reaction product of the polyfunctional compound and the amino compound is usually carried out at about 30°-200° C., preferably at 40°-150° C. When the reaction temperature is lower than about 30° C., the reaction unpreferably requires longer time, whereas when the reaction temperature is higher than 200° C., decomposition of the functional groups undesirably takes place.

The reaction is usually carried out for about 5 minutes to 24 hours. The reaction can also be carried out either under reduced pressure, atmospheric pressure, or increased pressure.

The reaction can be carried out in the absence of a solvent, or in the presence of a solvent such as water, or an organic solvent, e.g. N,N-dimethylformaide, formamide, N,N-dimethylsulfoxide, chloroform, carbon tetrachloride, 1,2-dichloroethane, perchloroethylene, dioxane, methanol, ethanol, propanol, butanol, benzene, toluene, chlorobenzene, or the like.

As the polyfunctional compound (B), compounds having at least two amine-reactive groups such as halogen, epoxy group, isocyanate group, or the like in the molecule can be used. Examples of the polyfunctional compounds are epihalohydrins such as epichlorohydrin, epibromohydrin, epiiodohydrin, 1,2-epoxy-4-chlorobutane, 1,2-epoxy-4-bromobutane, 1,2-epoxy-4-iodobutane, 2,3-epoxy-4-chlorobutane, 2,3-epoxy-4-bromobutane, 2,3-epoxy-4-iodobutane, 2,3-epoxy-5-chloropentane, 2,3-epoxy-5-bromopentane, 1,2-epoxy-5-chloropentane, etc.; epoxy compounds such as 2,2-bis(p-1,2-epoxypropoxyphenyl)-propane, 1,4-bis(1,2-epoxypropoxy)benzene, N,N'-bis(2,3-epoxypropyl)piperazine, ethylene glycol diglycidyl ether, propylene glycol diglycidyl ether, glycerol diglycidyl ether, polyethylene glycol diglycidyl ether, polypropylene glycol diglycidyl ether, 1,2,3,4-diepoxybutane, etc.; halides such as thiophosgene, glycerin dichlorohydrin, phthaloyl chloride, succinyl chloride, chloroacetyl chloride, chlorosuccinyl chloride, etc.; ketones such as chloroacetone, bromoacetone, etc.; aldehydes such as glyoxal, etc.; isocyanates such as hexamethylene diisocyanate, tolylene diisocyanate, meta-xylylene diisocyanate, cyclohexylmethane-4,4-diisocyanate, etc.; and derivatives of these compounds. Among them, epihalohydrins such as epichlorohydrin, epibromohydrin, epiiodohydrin, and the like are preferable.

Examples of the amino compounds (C) are ammonia, aliphatic amines such as monomethylamine, monoethylamine, ethylenediamine, trimethylenediamine, tetramethylenediamine, pentamethylenediamine, hexamethylenediamine, octamethylenediamine, nonamethylenediamine, diethylenetriamine, triethylenetetramine, tetraethylenepentamine, hydrazine, dimethylamine, diethylamine, etc.; alkanolamines such as ethanolamine, diethanolamine, etc.; aromatic amines such as aniline, para-phenylenediamine, etc.; alicyclic amines such as cyclohexylamine, piperidine, piperazine, pyrrolidine, diaminocyclobutane, diaminocyclopentane, diaminocyclohexane, diaminocycloheptane, diaminocyclooctane, etc.; amines containing oxygen, nitrogen or sulfur such as diaminofuran, diaminothiophene, diaminopyran, diaminothiopyran, aminopyridine, diaminopyridine, etc.; amino acids such as iminodiacetic acid, iminodipropionic acid, iminodi($\alpha$-methyl)propionic acid, glutamic acid, aspartic acid, etc. and their sodium, potassium, lithium or ammonium salts, or their alkyl esters wherein the alkyl is methyl, ethyl, propyl or the like. Among these amino compounds, diethylamine, aminopyridine, diethanolamine, aniline, para-phenylenediamine, iminodiacetic acid, methyl iminodiacetate, iminodipropionic acid, and methyl iminodipropionate are more preferable.

The chelate resin produced by the process of the present invention shows an excellent effect of collecting heavy metals but the reason for it is not clear. Probably, mutual action of the oxygen or sulfur or nitrogen atom in the amino compound and the nitrogen atom in amino groups in the aminated resin may make chelate bond strength increase.

The chelate resin thus produced can be used as it is or after washing and drying for appropriate applications. If necessary, the chelate resin may be treated with a base or acid before use.

In carrying out the process of the present invention for collecting heavy metals in a solution or gas, the chelate resin is contacted with the solution or gas containing heavy metals using conventional technique. There is no limitation to the contacting method. But in the case of a solution containing heavy metals, it is preferable to dip the chelate resin in said solution or to pass said solution through a column packed with the chelate resin. On the other hand, in the case of a gas containing heavy metals, it is preferable to pass said gas through a column packed with the chelate resin.

Heavy metals which can be collected by the chelate resin of the present invention are not limited so long as they can bond to the chelate resin. Examples of the heavy metals collectable are mercury, cadmium, lead, chromium, zinc, copper, gold, silver, platinum, uranium, nickel, vanadium, palladium, etc.

The chelate resin having collected heavy metals can be regenerated by the treatment with a mineral acid such as hydrochloric acid, sulfuric acid, nitric acid, or the like, or with a sulfide compound or chelating agents such as sodium sulfide, sodium polysulfide, ethylenediaminetetraacetic acid, or the like, or by electrolysis, to use the chelate resin again.

On the other hand, the heavy metals adsorbed on the chelate resin can be recovered by burning the chelate resin having collected the heavy metals or the like treatment.

The chelate resin of the present invention can be particularly favorably applied for removing heavy metals from an aqueous solution containing one or more these heavy metals. In addition, the chelate resin of the present invention can also be applied for recovering valuable metals such as uranium from sea water, uranium extraction treatment waste water and nuclear fuel plant waste material. The chalate resin of the present invention may further be used for analysis, for separating and purifying organic materials, for catalysis, or as a starting material for producing chemical resistant resins.

As mentioned above, the chelate resin of the present invention has many advantages in that it is hardly influenced by coexisting ions comparing with the conventional chelate resins, and a heavy metal adsorption equilibrium concentration in an aqueous solution of a high salt concentration can be lowered remarkably, and moreover it can be produced simply and cheaply.

The present invention is illustrated but not limited by the following Examples in which all parts and percents are by weight unless otherwise specified.

EXAMPLE 1

To 124 parts of vinyl chloride resin obtained by emulsion polymerization having a particle size of 10–60 mesh (Tyler standard), 240 parts of ethylenediamine and 80 parts of water were added and a reaction was carried out at 110°–132° C. for 4 hours. The resulting reaction product was filtered, washed with water and dried to give 108.4 parts of brown aminated resin.

In a reactor, 25 parts of the thus produced aminated resin, 11.8 parts of 3-aminopyridine, 11.8 parts of epichlorohydrin and 94 parts of water were placed and a reaction was carried out at 60°–70° C. for 1 hour. The resulting resin portion was washed with water, filtered and dried to give 29.7 parts of brown chelate resin. Elementary analysis of the resin showed that 3.2 parts of epichlorohydrin and 2.9 parts of 3-aminopyridine were reacted.

EXAMPLE 2

To 76 parts of chlorinated polyethylene having a chlorine content of 53% and having a particle size of 24–48 mesh, 170 parts of diethylenetriamine and 43 parts of water were added and a reaction was carried out at 120°–140° C. for 3 hours. The resulting reaction product was filtered, washed with water and dried to give 69 parts of brown aminated resin.

In a reactor, 25 parts of the thus produced aminated resin, 22.3 parts of disodium iminodipropionate, 11.5 parts of epichlorohydrin and 100 parts of water were placed and a reaction was carried out at 50°–100° C. for 3 hours. The resulting resin portion was washed with water, filtered and dried to give 31 parts of yellowish brown chelate resin. Elementary analysis of the resin showed that 3.9 parts of epichlorohydrin and 3.4 parts of disodium iminodipropionate were reacted.

EXAMPLE 3

To 100 parts of chlorinated polypropylene having a chlorine content of 45% and having a particle size of 10–60 mesh, 150 parts of triethylenetetramine and 17 parts of water were added and a reaction was carried out at 120°–155° C. for 4 hours. The resulting reaction product was filtered, washed with water and dried to give 97 parts of brown aminated resin.

In a reactor, 25 parts of the thus produced aminated resin, 4.6 parts of aniline, 7.5 parts of epibromohydrin and 100 parts of ethanol as a solvent were placed and a reaction was carried out at 60°–75° C. for 3 hours. The resulting resin portion was washed with water, filtered and dried to give 32 parts of brown chelate resin. Elementary analysis of the resin showed that 6.6 parts of epibromohydrin and 4.1 parts of aniline were reacted.

EXAMPLE 4

To 214 parts of vinyl bromide resin having a particle size of 10–60 mesh, 700 parts of hexamethylenediamine and 70 parts of water were added and a reaction was carried out at 80°–95° C. for 15 hours. The resulting reaction product was filtered and washed with water to give 317 parts (undried) of brown aminated resin.

The resulting aminated resin (undried) in an amount of 50 parts was reacted with 4.7 parts of epichlorohydrin in the presence of 100 parts of N,N-dimethylformamide at 50°–60° C. for 30 minutes, and subsequently 8 parts of methyl iminodiacetate was added thereto and the reaction was continued for 2 hours. Then, 13 parts of 30% NaOH aqueous solution was added thereto and the reaction was continued for additional 1 hour at 80°–100° C. The resulting resin portion was filtered and washed with water to give 57 parts (undried) of brown chelate resin. Elementary analysis of the resin showed that 3.5 parts of epichlorohydrin and 4.3 parts of methyl iminodiacetate were reacted.

EXAMPLES 5–10

To 1240 parts of vinyl chloride resin obtained by emulsion polymerization having a particle size of 10–60 mesh, 1890 parts of tetraethylenepentamine and 210 parts of water were added and a reaction was carried out at 130°–170° C. for 1 hour. The resulting reaction product was filtered, washed with water and dried to give 1030 parts of brown aminated resin.

Subsequently, 25 parts of the thus obtained aminated resin was reacted using a procedure similar to that described in Example 1 under the conditions as listed in Table 1 to give a brown chelate resin.

TABLE 1

| Example | Example 5 | Example 6 | Example 7 | Example 8 | Example 9 | Example 10 |
|---|---|---|---|---|---|---|
| Reaction conditions | | | | | | |
| Epihalohydrin (parts) | Epichlorohydrin | Epichlorohydrin | Epiiodohydrin | Epiiodohydrin | 1,2-Epoxy-4-bromobutane | 1,2-Epoxy-5-chloropentane |
|  | 9.4 | 9.4 | 18.3 | 36.0 | 30.2 | 24.0 |
| Amino compound (parts) | Diethylamine | Diethanolamine | Monosodium L-glutamate | Disodium iminodiacetate | Cyclohexylamine | Piperidine |
|  | 7.4 | 7.0 | 16.6 | 34.4 | 17.0 | 15.0 |
| Solvent (parts) | Water | Ethanol | Water | Water | Dioxane | 1-Propanol |
|  | 100 | 100 | 100 | 100 | 100 | 100 |
| Reaction temp.(°C.) | 50–70 | 100–117 | 80–100 | 60–100 | 50–80 | 80–97 |
| Reaction time.(Hr) | 3 | 1 | 6 | 4 | 6 | 5 |
| Results of reaction | | | | | | |
| Chelate resin produced (parts) | 31.8 | 32.2 | 31.7 | 32.4 | 35.3 | 33.7 |
| Reacted amount of epihalohydrin (parts) | 4.9 | 4.1 | 9.8 | 15.3 | 9.2 | 6.3 |
| Reacted amount of amino compound (parts) | 3.7 | 4.6 | 3.6 | 2.5 | 5.9 | 4.3 |

EXAMPLE 11

To a mixture of 8.6 parts of 1,2,3,4-diepoxybutane and 100 parts of ethanol as a solvent, 9.3 parts of aniline was added and a reaction was carried out at 70°-78° C. for 30 minutes. Subsequently, 25 parts of the same aminated resin as used in Example 5 was added thereto and the reaction was continued for 4 hours at 70°-78° C. The resulting reaction product was filtered, washed with water and dried to give 32.3 parts of chelate resin. Elementary analysis of the resin showed that 3.6 parts of 1,2,3,4-diepoxybutane and 3.7 parts of aniline were reacted.

EXAMPLE 12

To a mixture of 16.1 parts of methyl iminodiacetate and 100 parts of ethanol as a solvent, 13 parts of thiophosgene was added and a reaction was carried out at 60°-73° C. for 1 hour. Subsequently, 25 parts of the same aminated resin as used in Example 5 was added thereto and the reaction was continued for 1 hour at 70°-80° C., followed by the addition of 50 parts of a 30% NaOH aqueous solution and the additional reaction at 70°-80° C. for 1 hour. The resulting reaction product was filtered, washed with water and dried to give 33.4 parts of brown chelate resin. Elementary analysis of the resin showed that 4.4 parts of thiophosgene and 6.0 parts of methyl iminodiacetate were reacted.

EXAMPLE 13

To 25 parts of the same aminated resin as used in Example 5, 15.5 parts of succinyl chloride, 100 parts of tetrachloroethylene as a solvent, and 20.2 parts of triethylamine as a reaction accelerator were added and a reaction was carried out at 70°-90° C. for 3 hours. Subsequently, 16.2 parts of p-phenylenediamine was added thereto and the reaction was continued at 70°-90° C. for 5 hours. The resulting reaction product was filtered, washed with water and dried to give 34.3 parts of brown chelate resin. Elementary analysis of the resin showed that 8.1 parts of succinyl chloride and 5.6 parts of p-phenylenediamine were reacted.

EXAMPLE 14

To a mixture of 25 parts of the same aminated resin as used in Example 5, 8.6 parts of piperazine and 100 parts of water as a solvent, 15.6 parts of hexamethylene diisocyanate was added and a reaction was carried out at 50°-80° C. for 8 hours. The resulting reaction product was filtered, washed with water and dried to give 34.7 parts of brown chelate resin. Elementary analysis of the resin showed that 6.3 parts of hexamethylene diisocyanate and 3.4 parts of piperazine were reacted.

EXAMPLE 15

46.4 Parts of aniline and 376 parts of water as a solvent were heated to 80°-100° C. and 46 parts of epichlorohydrin was added thereto. After the reaction at 80°-100° C. for 1 hour, 100 parts of the same aminated resin as used in Example 5 was added thereto and the reaction was continued for 3 hours at 80°-99° C. The resulting reaction product was filtered, washed with water and dried to give 154.6 parts of brown chelate resin. Elementary analysis of the resin showed that 34 parts of epichlorohydrin and 33 parts of aniline were reacted.

EXAMPLE 16

To 62 parts of vinyl chloride resin obtained by emulsion polymerization having a particle size of 10-35 mesh, 120 parts of ethylenediamine and 40 parts of water were added and a reaction was carried out at 110°-132° C. for 4 hours. The resulting reaction product was filtered, washed with water and dried to give 54.2 parts of brown aminated resin.

In a reactor, 25 parts of the thus produced aminated resin, 17.8 parts of iminodiacetic acid, 18.6 parts of epichlorohydrin and 195 parts of water were placed and a reaction was carried out at 80°-90° C. for 1 hour. Subsequently, 55 parts of a 30% KOH aqueous solution was added thereto and a base treatment was conducted at 90°-40° C. for 1 hour. The resulting reaction product was washed with water, filtered and dried to give 29.5 parts of brown chelate resin. Elementary analysis of the resin showed that 1.8 parts of epichlorohydrin and 2.5 parts of the iminodiacetic acid were reacted.

EXAMPLE 17

To 111 parts of chlorinated vinyl chloride resin having a chlorine content of 63% and having a particle size of 10-28 mesh, 400 parts of triethylenetetramine and 45 parts of water were added and a reaction was carried out at 140°-160° C. for 4 hours. The resulting reaction product was filtered, washed with water and dried to give 103 parts of brown aminated resin.

To a reaction product which had been obtained by reacting 26.7 parts of iminodiacetic acid with 23 parts of epichlorohydrin in the presence of 400 parts of water as a solvent at 40°-60° C. for 1 hour, 50 parts of the thus produced aminated resin was added and a reaction was carried out at 60°-70° C. for 60 minutes. The resulting reaction product was filtered, washed with water and unreacted iminodiacetic acid and epichlorohydrin were removed. The reaction product was immersed in 54 parts of a 15% NaOH aqueous solution for 1 hour at room temperature to conduct a base treatment. Subsequently, the reaction product was washed with water, filtered, and dried to give 58 parts of brown chelate resin. Elementary analysis of the resin showed that 3.2 parts of epichlorohydrin and 4.4 parts of iminodiacetic acid were reacted.

EXAMPLE 18

To 50 parts of an aqueous solution of pH 5.5 containing $CdCl_2$ with a Cd concentration of 107 mg/l and NaCl with a Na concentration of 39.3 g/l, 0.25 part on dry resin basis of individual chelate resins obtained in the above-mentioned Examples as listed in Table 2, a phenol resin based chelate resin, or the aminated resin obtained in Example 1 were added and contacted for 1 hour with shaking. The Cd concentrations in individual treated aqueous solutions were as shown in Table 2.

TABLE 2

| Run No. | Kind of chelate resin | Cd concentration in a treated aqueous solution (mg/l) |
|---|---|---|
| 1 | Example 2 | 1.2 |
| 2 | Example 4 | 1.0 |
| 3 | Example 7 | 2.3 |
| 4 | Example 8 | 0.9 |
| 5 | Example 12 | 1.1 |
| 6 | Example 16 | 1.8 |
| 7 | Example 17 | 1.1 |
| 8 | Phenol resin based chelate resin | 49.0 |

TABLE 2-continued

| Run No. | Kind of chelate resin | Cd concentration in a treated aqueous solution (mg/l) |
| --- | --- | --- |
| 9 | Aminated resin obtained in Example 1 | 13.2 |

The phenol resin based chelate resin was prepared as follows.

A mixed aqueous solution of 47.0 parts of phenol, 66.5 parts of iminodiacetic acid and 40.5 parts of 37% formalin was heated from room temperature to 70° C. for 40 minutes and stirring was continued at 70°–73° C. for 2 hours. Subsequently, the temperature was lowered to 40° C. and 100 parts of demineralized water dissolving 60 parts of NaOH was added thereto to adjust the reaction system to pH 12.8. Then, 162.0 parts of 37% formalin was added to the reaction system, which was gradually heated so that the temperature was raised to 70° C. after 40 minutes and the reaction was continued at 70°–90° C. for 3 hours. Subsequently, 47.0 parts of phenol was added to the reaction system and reacted at 70°–90° C. for 1 hour. Then 115.0 parts of water was distilled off under reduced pressure while maintaining the reaction system at 90°–100° C. to give 249 parts of viscous reddish brown resin composition. The resin composition was cured with heating in a hot-air drier at 130° C. for 3 hours. Then the resin was ground to give the phenol resin based chelate resin having a particle size of 10–35 mesh.

EXAMPLE 19

To 100 parts of aqueous solution of pH 6.0 containing $CdCl_2$ with a Cd concentration of 100 mg/l, NaCl with a Na concentration of 11.79 g/l, and NaClO with a Cl concentration of 500 mg/l, 0.5 part on dry resin basis of each chelate resin obtained in the above-mentioned Examples as listed in Table 2, the phenol resin based chelate resin mentioned in Example 18 or the aminated resin obtained in Example 1 was added and contacted for 1 hour with shaking. The Cd concentrations in individual treated aqueous solutions were as shown in Table 3.

TABLE 3

| Run No. | Kind of chelate resin | Cd concentration in a treated aqueous solution (mg/l) |
| --- | --- | --- |
| 1 | Example 2 | 9.7 |
| 2 | Example 4 | 8.9 |
| 3 | Example 7 | 11.7 |
| 4 | Example 8 | 8.7 |
| 5 | Example 12 | 9.1 |
| 6 | Example 16 | 9.3 |
| 7 | Example 17 | 8.6 |
| 8 | Phenol resin based chelate resin | 73.0 |
| 9 | Aminated resin obtained in Example 1 | 32.3 |

EXAMPLE 20

To 100 parts of aqueous solution of pH 8.2 containing $Na_4(UO)_2(CO_3)_2$ with a U concentration of 100 mg/l and NaCl with a Na concentration of 13.1 g/l, 0.5 part on dry resin basis of each chelate resin obtained in the above-mentioned Examples as listed in Table 4, the phenol resin based chelate resin mentioned in Example 18 or the aminated resin obtained in Example 4 was added and contacted for 1 hour with shaking. The U concentrations in individual treated aqueous solutions were as listed in Table 4.

TABLE 4

| Run No. | Kind of chelate resin | U concentration in a treated aqueous solution (mg/l) |
| --- | --- | --- |
| 1 | Example 1 | <0.1 |
| 2 | Example 3 | <0.1 |
| 3 | Example 5 | <0.1 |
| 4 | Example 6 | <0.1 |
| 5 | Example 9 | <0.1 |
| 6 | Example 10 | <0.1 |
| 7 | Example 11 | <0.1 |
| 8 | Example 13 | <0.1 |
| 9 | Example 14 | <0.1 |
| 10 | Example 15 | <0.1 |
| 11 | Phenol resin based chelate resin | 82 |
| 12 | Aminated resin obtained in Example 4 | 73 |

EXAMPLE 21

To 100 parts of aqueous solution of pH 3.0 containing $CuCl_2$ with a Cu concentration of 100 mg/l, 0.5 part on dry resin basis of each chelate resin obtained in the above-mentioned Examples as listed in Table 5, the phenol resin based chelate resin mentioned in Example 18 or the aminated resin obtained in Example 1 was added and contacted for 1 hour with shaking. The Cu concentrations in individual treated aqueous solutions were as listed in Table 5.

TABLE 5

| Run No. | Kind of chelate resin | Cu concentration in a treated aqueous solution (mg/l) |
| --- | --- | --- |
| 1 | Example 1 | 1.2 |
| 2 | Example 2 | 1.4 |
| 3 | Example 3 | 3.3 |
| 4 | Example 4 | 0.8 |
| 5 | Example 16 | 2.1 |
| 6 | Example 17 | 1.8 |
| 7 | Phenol resin based chelate resin | 23.0 |
| 8 | Aminated resin obtained in Example 1 | 12.3 |

EXAMPLE 22

To 100 parts of aqueous solution of pH 5.0 containing $K_2Cr_2O_7$ with a Cr concentration of 100 mg/l and NaCl with a Na concentration of 13.1 g/l, 0.5 part on dry resin bases of each chelate resin obtained in the above-mentioned Examples as listed in Table 6, the phenol resin based chelate resin mentioned in Example 18 or the aminated resin obtained in Example 1 was added and contacted for 1 hour with shaking. The Cr concentrations in individual treated aqueous solutions were as listed in Table 6.

TABLE 6

| Run No. | Kind of chelate resin | Cr concentration in a treated aqueous solution (mg/l) |
| --- | --- | --- |
| 1 | Example 1 | 0.2 |
| 2 | Example 3 | 0.6 |
| 3 | Example 5 | 0.1 |
| 4 | Example 6 | 0.1 |
| 5 | Phenol resin based chelate resin | 63.8 |
| 6 | Aminated resin obtained | 11.3 |

TABLE 6-continued

| Run No. | Kind of chelate resin | Cr concentration in a treated aqueous solution (mg/l) |
|---|---|---|
| | in Example 1 | |

EXAMPLE 23

An adsorption column having a diameter of 2 cm with a height of 50 cm was packed with each chelated resin obtained in Examples 5, 6 and 10. An air containing mercury vapor with a concentration of 10 mg/m$^3$ was passed through the column at a rate of 10 l/min and the mercury concentration in the air after passing the column was measured by using atomic absorption spectrophotometry. For comparison, the phenol resin based chelate resin mentioned in Example 18 or the aminated resin obtained in Example 1 was used in place of the chelate resins of the above-mentioned Examples and the same procedure as mentioned above was repeated. The results are as shown in Table 7. Permeability magnification was 2500 in each case.

TABLE 7

| Run No. | Kind of chelate resin | Hg concentration in the air after treatment (mg/m$^3$) |
|---|---|---|
| 1 | Example 5 | 0.003 |
| 2 | Example 6 | 0.002 |
| 3 | Example 10 | 0.004 |
| 4 | Phenol resin based chelate resin | 8.73 |
| 5 | Aminated resin obtained in Example 1 | 0.152 |

As shown in Examples 18–23, the chelate resins of the present invention are by far better than known chelate resins in heavy metal adsorption ability and scarcely influenced by coexisting ions at the adsorption of heavy metal, and moreover can make a heavy metal adsorption equilibrium concentration lower in an aqueous solution containing an oxidizing agent such as sodium hypochlorite.

What is claimed is:

1. A process for producing a chelate resin which comprises reacting at a temperature of about 30° to 200° C.
   (A) a resin having one or more primary and/or secondary amino groups in the molecule and being selected from the group consisting of polyethyleneimine, aniline resin, melamine resin, and resins aminated by reacting a resin with ammonia, aliphatic mono- or polyamines, aromatic mono- or polyamines or derivatives thereof, with
   (B) a polyfunctional compound having at least two amine-reactive groups and
   (C) an amino compound having one or more primary and/or secondary amino groups, the polyfunctional compound (B) and the amino compound (C) being used in an amount of 1/20 mole or more and 1/20 mole or more, respectively, per equivalent weight of the amino group in resin (A), or
   a reaction product of the polyfunctional compound (B) and the amino compound (C), the reaction product being used in an amount of 1/20 mole or more per equivalent weight of the amino group in the resin (A).

2. A process according to claim 1, wherein the amounts of the polyfunctional compound (B) and the amino compound (C) are 1/10–2/1 moles and 1/10–2/1 moles, respectively, per equivalent weight of the amino group in the (A) resin.

3. A process according to claim 1, wherein the amount of the reaction product is 1/10–2/1 moles per equivalent weight of the amino group in the (A) resin.

4. A process according to claim 1, wherein the (A) resin is obtained by reacting a halogen-containing resin with an amino compound.

5. A process according to claim 4, wherein the halogen-containing resin is polyvinyl chloride, polyvinylidene chloride, polyvinyl bromide, polyvinylidene bromide, polyvinyl iodide or halogenated resins obtained by halogenating halogen-free resin.

6. A process according to claim 1, wherein the polyfunctional compound is epihalohydrins, epoxy compounds, halides, ketones, aldehydes, isocyanates or derivatives thereof.

7. A chelate resin produced by reacting at a temperature of about 30° to 200° C.
   (A) a resin having one or more primary and/or secondary amino groups in the molecule selected from the group consisting of polyethyleneimine, aniline resin, melamine resin and resins aminated by reacting a resin with ammonia, aliphatic mono- or polyamines, aromatic mono- or polyamines or derivatives thereof, with
   (B) a polyfunctional compound having at least two amine-reactive groups and
   (C) an amino compound having one or more primary and/or secondary amino groups, the polyfunctional compound (B) and the amino compound (C) being used in an amount of 1/20 mole or more and 1/20 mole or more, respectively, per equivalent weight of the amino group in resin (A),
   or with a reaction product of the polyfunctional compound (B) and the amino compound (C), the reaction product being used in an amount of 1/20 mole or more per equivalent weight of the amino group in resin (A).

8. A method for collecting one or more heavy metals from a solution or gas containing said heavy metals which comprises contacting said solution or gas containing heavy metals with a chelate resin produced by reacting at a temperature of about 30° to 200° C.
   (A) a resin having one or more primary and/or secondary amino groups in the molecule selected from the group consisting of polyethyleneimine, aniline resin, melamine resin and resins aminated by reacting a resin with ammonia, aliphatic mono- or polyamines, aromatic mono- or polyamines or derivatives thereof, with
   (B) a polyfunctional compound having at least two amine reactive groups and
   (C) an amino compound having one or more primary and/or secondary amino groups, the polyfunctional compound (B) and the amino compound (C) being used in an amount of 1/20 mole or more and 1/20 mole or more, respectively, per equivalent weight of the amino group in resin (A),
   or with a reaction product of the polyfunctional compound (B) and the amino compound (C), the reaction product being used in an amount of 1/20 mole or more per equivalent weight of the amino group in resin (A).

9. A method according to claim 8, wherein the contacting of the solution or gas containing one or more heavy metals with the chelate resin is carried out by using a column packed with said chelate resin.

* * * * *